Patented May 9, 1950

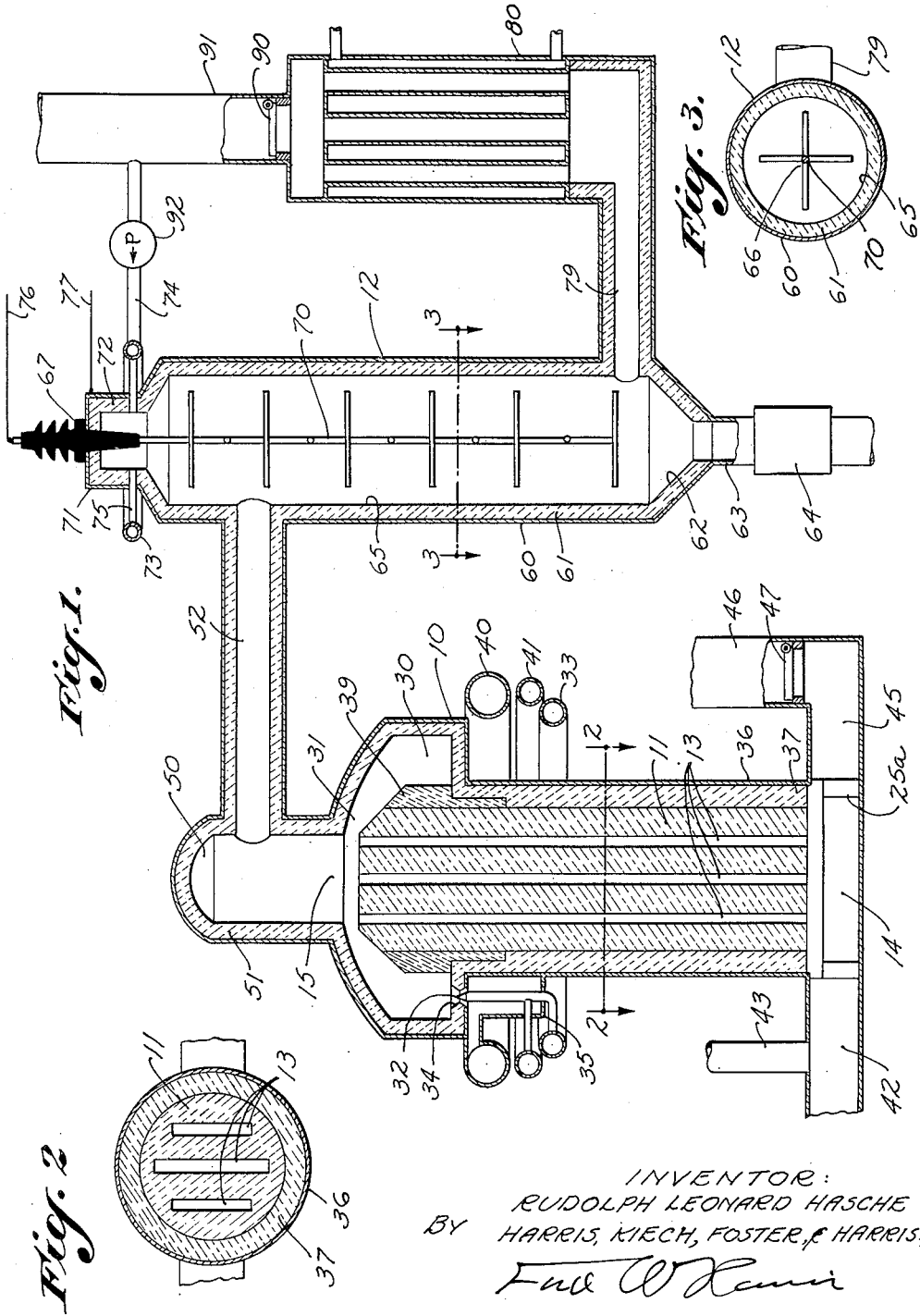

2,507,157

UNITED STATES PATENT OFFICE 2,507,157

PROCESS OF PRODUCING ACETYLENE BLACK

Rudolph Leonard Hasche, Johnson City, Tenn., assignor to Tennessee Eastman Corporation, Kingsport, Tenn., a corporation of Virginia Application December 22, 1945, Serial No. 636,725

6 Claims. (Cl. 23—209.4)

My invention relates to a process by which a suitable charging stock, such as methane, may be converted into acetylene black and hydrogen.

Acetylene black is a form of carbon for which there is a substantial demand, although this demand is now limited by the high price of this material. It is at present, as far as I am aware, made from acetylene produced from calcium carbide, and it is therefore rather expensive, as the heat necessary to form acetylene by any electrical process is supplied as electrical energy, which is expensive. I have found that acetylene black can be made directly from relatively cheap hydrocarbons without using electrical energy in the formation of the black, and it is an object of my invention to provide a process embodying my discovery.

My invention includes and my process may be practiced in the apparatus shown in the drawings, which are for illustrative purposes only, and in which:

Fig. 1 is a vertical cross section through the apparatus;

Fig. 2 is a section on a plane represented by the line 2—2 of Fig. 1, this plane being viewed from above or in the direction of the arrows adjacent the ends of the line 2—2; and Fig. 3 is a section on a plane represented by the line 3—3 of Fig. 1, this plane being viewed from above or in the direction of the arrows adjacent the ends of the line 3—3.

The apparatus illustrated in the drawings includes a furnace 10 and a precipitator 12. The furnace contains a regenerative mass 11. The regenerative mass 11 may be formed of loose carborundum bricks so placed as to provide vertical, substantially straight, and open primary passages 13 which extend through the mass 11 and connect a primary space 14 below the mass with a secondary space 15 above the mass.

The regenerative mass 11 is so constructed that it can be supported wholly on a steel structure 25a in the primary space 14. This space 14, as will be understood from the description appearing later herein, never contains gas at a temperature which will substantially impair the strength of steel, and the lower end of the regenerative mass 11 never reaches such a destructive temperature.

Surrounding the upper end of the regenerative mass 11 is an annular combustion chamber 30, which is in communication with the secondary space 15 through an uninterrupted annular throat 31. Combustion in this space is provided by five equally spaced burners 32, each fed with gas from a fuel gas manifold 33. The combustion products in the space 15 may have a temperature of 3200–3400° F. The burners 32 discharge through openings 34 in the lower wall of the combustion space 30, these openings connecting the combustion space with pipes 35 forming part of each burner. A steel shell 36 surrounds the mass 11 and the combustion chamber 30. Surrounding the mass 11 inside the shell 36 is an annular layer of heat insulating material 37. Surrounding the upper end of the regenerative mass 11 is a ring of carborundum 39. Air is supplied to the pipes 35 from an air manifold 40, and steam is admitted into the burners 32 from a steam manifold 41.

I prefer to line the inside of the combustion chamber 30 with carborundum brick, but it should be understood that carborundum is merely a preferred refractory material and wherever I have specified its use any refractory material having satisfactory characteristics may be used. In fact, in actual furnace construction I do not use carborundum as the material for the annular layer 37, in which a low thermal conductivity is desirable.

The primary space 14 is provided with an inlet pipe 42 through which the gas to be processed may be supplied to the space 14, and steam or other inert diluent gas may be supplied to the primary space 14 through a pipe 43. The pipes 42 and 43 are provided with valves, as are the pipes that supply fuel gas to the pipes 35, and as is the pipe supplying steam to the burners 32, these valves also not being shown. The primary space 14 also has an outlet pipe 45 through which combustion gases are conducted to a stack 46 through a valve 47.

The furnace is operated in a periodically recurring cycle consisting of a heating, a purging, and a treating period. At the beginning of the heating period, the valve 47 is open, and during this heating period no gas is supplied to the primary space 14 through the pipe 42.

Fuel gas is supplied to the burners 32 from the manifold 33, and air for combustion is supplied to the pipes 35 from the manifold 40. It is important to so regulate the flow of air and gas that each of the burners will produce combustion products of about the same volume and at about the same temperature. In the drawings, I show five burners 32, but in large furnaces more than five burners are desirable. The burners may be inserted through the side walls of the combustion chamber 30, their exact location being somewhat a matter of convenience. If the burners are properly operated, the combustion chamber 30 is filled with an annular ring of combustion gases at a fairly uniform temperature of 3200° F. to 3400° F. I have found that in a properly designed furnace a heat liberation of 750,000 to 1,000,000 B. t. u. per hour for each cubic foot of combustion space is possible. This ring of combustion products surrounds the upper end of the ring 39 and tends to heat it. The combustion products flow evenly through the throat 31, which is constricted to an area perpendicular to the gas flow of at least ⅓ of the area on a horizontal plane of the combustion space 30. This constriction tends to promote an even flow of combustion products through the throat 31. Combustion products flow through the throat at a rather uniform velocity and temperature all around the throat, and this velocity is lowered in the space 15 before the gases change direction and flow downwardly through the primary passages 13. The changes in velocity and direction of the combustion gases in passing from the combustion chamber 30 to the space 15 tend to mix the gases and produce a very uniform temperature of the gases entering each of the passages 13, which is highly desirable, as it is my purpose to uniformly heat the regenerative mass to the maximum temperature at which it can be used in practice.

I prefer to operate the furnace so that no portion of the regenerative mass is at a temperature above 3000° F., in order to prevent rapid deterioration of the carborundum, and to operate as close as is practicable to this temperature in order to improve the degree of conversion of the methane to acetylene. A uniform heating of the mass 11 can only be accomplished by uniformity of temperature of the combustion products in the combustion chamber 30 and a uniform flow of gases through the throat 31.

The primary passages 13 should be of such size, and the volume of the combustion products should be such, that the combustion products passing downwardly through the primary passages attain a high velocity, preferably in excess of 10,000 feet a minute. The products of combustion are drawn from the primary space 14 through the pipe 45 and valve 47 into the stack 46, which provides a draft, thereby aiding in withdrawing the products of combustion from the system. The regenerative mass 11 should be of sufficient length to insure a temperature at the bottom of the mass of about 900° F. when the top of the mass is at 3000° F., and when the mass reaches these temperatures the firing period terminates and the flow of gas to the burners 32 from the manifold 33 and the flow of air to the pipes 35 are both shut off. This firing period, when the furnace is operating on the cycle, may be from 1 to 2 minutes.

The purging period, which may require 3 seconds, then occurs. The valve 47 is closed at the end of the heating period. Steam or other purging agent is admitted to the primary space 14 from the pipe 42 and flows upwardly through the primary passages 13 to the space 15. This flow purges the primary passages 13 of combustion products. Steam is at the same time admitted to the burners 32 from the manifold 41 to purge the combustion chamber 30 of combustion products, and a flow of steam from the manifold 41 is maintained until the end of the treating period, this steam preventing the gas being treated during the treating period from entering the combustion chamber 30 and protecting the burners 32 from injury by the combustion gases.

During the treating period, the gas to be treated, for example, a mixture containing methane, is delivered to the primary space 14 from the pipe 42 and flows upwardly through the primary passages 13, being heated by contact twith the hot regenerative mass. In making acetylene, I prefer not to heat the methane mixture before it enters the primary space 14. In its passage upwardly through the primary passages, the mixture is heated to a temperature of about 2800° F. At or perhaps below this temperature, the methane is converted into acetylene, hydrogen being released. This reaction absorbs large quantities of heat which is obtained from the regenerative mass 11. At this high temperature the reaction is very rapid, taking not more than $\frac{1}{10}$ second, and it is important that the flow of gas should be such that the gas passes through the upper 10% of the regenerative mass in considerably less than $\frac{1}{10}$ second.

During the treating period, the gas leaving the primary passages 13 enters a dome 50, which is lined with carborundum brick 51. The gases may be at a temperature as high as 2800° F. They are then conducted throhgh a carborondhm lined conduit 52 to the precipitator 12. This precipitator consists of a steel shell 60 also lined with carborundum brick 61. The shell 60 has a conical bottom 62 and an outlet pipe 63 having a dump valve 64 therein. The acetylene black which is precipitated in a chamber 65 inside the shell 60 is removed through the dump valve 64.

Suspended on a rod 66 which passes through an insulator 67 is an electrode structure 70. The insulator 67 is supported on the top of a dome 71, which is an upward extension of the shell 60, and which is also lined with carborundum brick 72. A manifold 73 surrounds the dome 71 and feeds cold hydrogen, delivered to the manifold 73 by a pipe 74, to nozzles 75, which deliver the cold hydrogen to the interior of the dome 71. The gas delivered from the furnace 10 to the precipitator 12 is diluted with this cold gas and is cooled to a temperature of less than 2000° F. as it flows downwardly through the precipitator 12, and it is subjected to an electrostatic field established in the space between the electrode structure 70 and the shell 60. This field is established by an electrical potential imposed on this space supplied by a wire 76 connected to the rod 66 and a wire 77 which is connected to the shell 60, which is grounded. Potential is supplied to the wires 76 and 77 from any suitable source of electrical energy (not shown). A pulsating unidirectional potential of 10,000 volts may be used. Due to the establishment of this potential in the space between the electrode structure 66 and the shell 60, particles of acetylene black are agglomerated and fall to the bottom of the chammer 65.

Acetylene is very unstable at the temperatures maintained in the chamber 65 and tends to break down into carbon and hydrogen, the carbon being the desired acetylene black. This action would occur if no electrostatic field were present, for example, as described in applicant's copending application Serial No. 642,453, filed January 21, 1946, now Patent No. 2,475,282. This reaction of acetylene to carbon plus hydrogen is exothermic, the dilution with cold hydrogen from the nozzles 75 preventing too high a resultant temperature in the space 65, as well as reducing the temperature inside the dome 71, and thus protecting the insulator 67 from excessive temperature. The electrostatic field assists in the reaction of acetylene to carbon plus hydrogen and tends to agglomerate the carbon particles into masses that readily settle out of the gas. In large plants several precipitators 12 may be connected in series.

After passing through the precipitator 12, the gas passes through a conduit 79 to a cooler 80, which is merely a device for cooling the gas, which is largely hydrogen at this point. If the precipitator 12 is large enough, or enough precipitators are used, substantially all the acetylene black has been precipitated therein, and I prefer to cool the hydrogen in the cooler 80 to a temperature of 300° F. or below. The cooled hydrogen, after leaving the cooler 80, passes through a valve 90 to a pipe 91, from which hydrogen for the nozzles 75 is taken by the pipe 74 through a pump 92. Hydrogen from the pipe 91 is used as a fuel gas in the furnace 10, being supplied to the manifold 40 either alone or mixed with other fuel gas, and it may be supplied as a dilutent through the pipe 43. During the heating period of the furnace, the valve 90 is closed, thus shutting off all flow of gas to and through the precipitator 12. During this heating period of the furnace, potential is maintained on the precipitator 12, and the gas in the chamber 65 may continue to react to carbon plus hydrogen if it contains traces of acetylene.

In practice, natural gas will probably be the charging stock used, as it is abundant and cheap.

The method of operation is as follows: During the heating period, no charging stock is supplied through the conduit 42, the valve 47 is open, and the valve 90 is closed. Combustion occurs in the combustion chamber 30, and the hot gases of combustion flow downwardly through the passages 13 and out through the stack 46, heating the mass 11 to the maximum temperature which the mass will withstand without injury. The furnace may then be purged as previously described. During the treating period, the charging stock is supplied through the conduit 42 and flows through the passages 13 of the regenerative mass 11, where a gas containing a large proportion of acetylene is formed. This gas passes through the conduit 52 to the chamber 65, where the reaction of acetylene to carbon plus hydrogen occurs, the carbon is precipitated, and the hydrogen is taken off through the conduit 79 and cooled in the cooler 80. While I have referred to the gas delivered to the conduit 79 as hydrogen, it will only theoretically be hydrogen and, in fact, will contain unconverted charging stock and other hydrocarbons as well as some free suspended carbon. This mixture is a good fuel gas and will be used as such in the furnace and elsewhere. In fact, the gas delivered to the pipe 91 has a higher fuel value per pound than the charging stock.

I claim as my invention:

1. A process of producing acetylene black comprising the steps of subjecting a hydrocarbon gas containing a substantial proportion of methane to its dissociation temperature in a furnace for sufficient time to produce a mixed gas containing a substantial proportion of acetylene; passing said mixed gas from said furnace directly to a precipitating chamber; subjecting said mixed gas in said precipitating chamber to an electrostatic field before the temperature thereof falls below the dissociation temperature of acetylene to produce acetylene black and a second mixed gas containing a substantial proportion of hydrogen; introducing a gas, at a temperature substantially below the dissociation temperature of the acetylene, into said precipitating chamber to absorb the heat resulting from the dissociation, said gas being introduced in an amount sufficient to maintain the temperature of the gas in the chamber at a temperature below that at which the walls of the chamber would be damaged but above the dissociation temperature of said acetylene; and removing the acetylene black and said second mixed gas from said chamber.

2. A process of producing acetylene black comprising the steps of subjecting a hydrocarbon gas containing a substantial proportion of methane to its dissociation temperature in a furnace for sufficient time to produce a mixed gas containing a substantial proportion of acetylene; passing said mixed gas from said furnace directly to a precipitating chamber; subjecting said mixed gas in said precipitating chamber to an electrostatic field before the temperature thereof falls below the dissociation temperature of acetylene to produce acetylene black and a second mixed gas containing a substantial proportion of hydrogen; and removing the acetylene black and said second mixed gas from said chamber.

3. A process of producing acetylene black comprising the steps of subjecting a hydrocarbon gas containing a substantial proportion of methane to its dissociation temperature in a furnace for sufficient time to produce a mixed gas containing a substantial proportion of acetylene; passing said mixed gas from said furnace directly to a precipitating chamber; subjecting said mixed gas in said precipitating chamber to an electrostatic field before the temperature thereof falls below the dissociation temperature of acetylene to produce acetylene black and a second mixed gas containing a substantial proportion of hydrogen; separately removing the acetylene black and said second mixed gas from said chamber; cooling said second mixed gas to a temperature substantially below the dissociation temperature of acetylene; and returning the cooled gas which is predominantly hydrogen to said chamber to absorb heat resulting from the dissociation of the acetylene and to maintain the temperature of the mixed gas in said chamber above the dissociation temperature of acetylene but below a temperature at which said chamber would be damaged.

4. A process of producing particles of acetylene black, which comprises: passing a gas, which is at a temperature substantially above the dissociation temperature of acetylene and which contains acetylene, into a chamber in which the gas is subjected to the action of an electrostatic field; allowing a substantial portion of the carbon particles formed by the pyrolytic decomposition of acetylene to separate from said gas; and withdrawing said gas from contact with said separated particles, conditions being so regulated that the gas, while in said chamber, is maintained at a temperature at which acetylene is disassociated while in such an electrostatic field.

5. A process of producing particles of acetylene black, which comprises: passing a gas, which is at a temperature substantially above the dissociation temperature of acetylene and which contains acetylene, into a chamber in which the gas is subjected to the action of an electrostatic field; absorbing a sufficient portion of the heat of reaction produced by the decomposition of acetylene by injecting a heat absorbing diluent into said chamber to prevent the temperature of the gas in said chamber from rising to a point at which it would injure the walls of the chamber; allowing a substantial portion of the carbon particles formed by the pyrolytic decomposition of acetylene to separate from said gas; and withdrawing said gas from contact with said separated particles, conditions being so regulated that the gas, while in said chamber, is maintained at a temperature at which acetylene is disassociated while in such an electrostatic field.

6. A process of producing particles of acetylene black, which comprises: passing a gas, which is at a temperature substantially above the dissociation temperature of acetylene and which contains acetylene, into a chamber in which the gas is subjected to the action of an electrostatic field; absorbing a sufficient portion of the heat of reaction produced by the decomposition of acetylene by injecting a cooled gas, which has previously passed through the chamber and from which the acetylene has been removed by reaction to acetylene black and subsequent separation, into said chamber to prevent the temperature of the gas in said chamber from rising to a point at which it would injure the walls of the chamber; allowing a substantial portion of the carbon particles formed by the pyrolytic decomposition of acetylene to separate from said gas; and withdrawing said gas from contact with said separated particles, conditions being so regulated that the gas, while in said chamber, is maintained at a temperature at which acetylene is disassociated while in such an electrostatic field.

RUDOLPH LEONARD HASCHE.

REFERENCES CITED

The following references are of record in the file of this patent:

UNITED STATES PATENTS

| Number | Name | Date |
|---|---|---|
| 986,489 | Morehead | Mar. 14, 1911 |
| 1,797,368 | Rumbarger | Mar. 24, 1931 |
| 1,804,249 | Day | May 5, 1931 |
| 1,844,327 | Lyder | Feb. 9, 1932 |
| 1,917,627 | Wulff | July 11, 1933 |
| 2,261,319 | Wilcox | Nov. 4, 1941 |
| 2,318,688 | Hasche et al. | May 11, 1943 |
| 2,368,828 | Hanson et al. | Feb. 6, 1945 |

FOREIGN PATENTS

| Number | Country | Date |
|---|---|---|
| 24,256 | Great Britain | July 20, 1911 |